United States Patent [19]

Hilden et al.

[11] Patent Number: 4,737,419

[45] Date of Patent: Apr. 12, 1988

[54] OVERCOAT FOR PARTICULATE MAGNETIC RECORDING DISK

[75] Inventors: Magdalena M. Hilden, San Juan Bautista; Jia-Kuen J. Lee; Anthony W. Wu, both of San Jose, all of Calif.

[73] Assignee: International Business Machines Corporation, Armonk, N.Y.

[21] Appl. No.: 830,479

[22] Filed: Feb. 13, 1986

Related U.S. Application Data

[63] Continuation of Ser. No. 700,432, Feb. 11, 1985, abandoned.

[51] Int. Cl.$^4$ ................................. G11B 5/72
[52] U.S. Cl. .................... 428/695; 204/192.16; 427/130; 427/131; 428/900
[58] Field of Search ............... 427/127–132, 427/48; 428/695, 900; 204/192.16

[56] References Cited

U.S. PATENT DOCUMENTS 4,503,125 3/1985 Nelson et al. .

OTHER PUBLICATIONS

Friedman et al., vol. 9, No. 7, Dec. 1966, IBM Tech. Dis. Bull., Lubricants . . . Media.

"Properties of Amophous Carbon Films Produced by Magnetron Sputtering", *Thin Solid Films*, vol. 122, No. 3, Dec. 21, 1984) pp. 203–216.

"A Diamond-like Carbon Film", *RCA Review*, vol. 43, No. 4 (Dec. 1982), pp. 665–673.

*Primary Examiner*—Bernard D. Pianalto
*Attorney, Agent, or Firm*—Thomas R. Berthold

[57] ABSTRACT

Carbon is sputter-deposited as a protective overcoat on the coating of a magnetic recording disk of the type in which the coating includes magnetic particles dispersed in an organic binder. The carbon film exhibits excellent durability and lubricity, thereby eliminating the need to incorporate alumina or other load-bearing particles into the magnetic coating, and eliminating the need for a liquid lubricant on the disk surface.

9 Claims, No Drawings

OVERCOAT FOR PARTICULATE MAGNETIC RECORDING DISK

RELATED APPLICATIONS

This application is a continuation of application Ser. No. 700,432, filed on Feb. 11, 1985, in the name of M. M. Hilden, J. J. Lee, and A. W. Wu, now abandoned.

TECHNICAL FIELD

This invention relates to a magnetic recording disk of the type having a dispersion of magnetic particles within an organic binder as the magnetic coating on the disk substrate, and more particularly to such a disk having a carbon film thereon for improved durability and lubricity.

BACKGROUND OF THE INVENTION

A magnetic recording disk of the particulate media type is characterized by a substrate having a coating of magnetic particles dispersed in an organic binder. The organic binder typically includes various polymers, such as a blend of epoxy and phenolic resins, solvents, dispersants to aid in the dispersion of the magnetic particles in the binder, and flow agents to facilitate the subsequent spin coating of the disk substrate. After the disk has been cured, a liquid lubricant is then applied to the coating to facilitate movement of the read/write head over the disk surface during start and stop operations of the disk file. Some particulate magnetic recording disks also incorporate load-bearing particles, such as alumina ($Al_2O_3$), into the organic binder to increase the durability of the coating and prevent damage to the disk from impact from the read/write head. While the most common type of particulate recording disk is for horizontal recording, in which the magnetic axes of the particles are aligned parallel to the plane of the disk, particulate disks may also be fabricated for vertical recording by having the magnetic axes of the particles oriented perpendicular to the plane of the disk.

The use of a liquid lubricant on the disk presents disadvantages. If the disk is under-lubricated there may be too much friction between the disk and the read/write head, which results in increased wear to the disk and head. On the other hand, if the disk is over-lubricated, it becomes difficult for the head to break loose from the disk at start-up of the disk file.

The use of alumina or other load-bearing particles into the coating likewise presents disadvantages. Because the alumina lends nonhomogeneity to the coating, there is an increased number of magnetic defects, such as missing bits. Also, because the alumina particles are located close to the disk surface in order to accomplish their load bearing function, they are often forced out of the disk surface and thus create disk asperities. If it is desired to fly the head at a relatively low flying height, then the presence of asperities requires an additional step in the fabrication process, namely a smoothing or burnishing of the disk surface by a burnishing head which flies at a substantially reduced flying height to shear off the asperities. Despite the removal of the asperities, the alumina particles often move out of the disk coating and above the flying height of the read/write head during operation, which can cause the head to crash into the disk surface.

SUMMARY OF THE INVENTION

The invention is an improved particulate magnetic recording disk having a thin film of carbon as an overcoat on the magnetic coating, and a process for fabricating such a disk. In one embodiment of the invention, the carbon overcoat is sputter-deposited as a thin film over the magnetic coating. The carbon film eliminates the necessity for lubricant and load bearing particles and their associated problems and disadvantages.

The use of a sputter-deposited carbon film as a protective overcoat for thin film alloy magnetic recording disks is known, as disclosed in U.S. Pat. No. 4,503,125 to Nelson et al. An adhesion layer, such as a sputtered film of titanium, is required between the magnetic film and the carbon overcoat in such thin film alloy disks. It is believed that the sputter-deposition of protective overcoats on particulate magnetic recording disks has not been previously or successfully achieved for several reasons. First, the organic binder includes numerous substances, such as solvents, dispersants and flow agents, which may cause out-gassing into the high-vacuum environment of the sputtering chamber. This would be especially true if the organic coating were not fully-cured. The out-gassing problem does not exist in the case of thin film alloy disks. Secondly, because the coefficient of expansion of most organic coatings is substantially different than that of most suitable overcoats, substantial localized temperature gradients caused by the recording head contacting the disk, either inadvertently or during start and stop of the disk file, may cause delamination of the overcoat from the underlying organic coating. In a thin film alloy disk, the difference in coefficients of expansion between the magnetic film, the adhesion layer and the carbon overcoat is much less.

For a fuller understanding of the nature and advantages of the present invention, reference should be made to the accompanying detailed description.

DESCRIPTION OF THE PREFERRED EMBODIMENTS

A typical magnetic coating formulation for a particulate magnetic recording disk includes magnetic particles, such as particles $\gamma\text{-}Fe_2O_3$ or Co-doped $\gamma\text{-}Fe_2O_3$, within an organic binder. The binder typically includes heat-hardenable polymers (such as epoxy or phenolic resins or combinations thereof, polyurethanes or acrylates), solvents, dispersing agents and flow agents. The magnetic particles are first placed in a media mill or ball mill to break up agglomerations and further enhance the dispersion of the particles, and then mixed in the organic binder. If load-bearing particles, such as alumina, are to be used in the coating, they are also mixed into the coating formulation.

The resultant formulation is then applied as a coating to the disk substrate, such as a highly polished aluminum-magnesium alloy disk, by pouring it onto the substrate while it is spinning. A magnetic field is applied to the spinning substrate to orient the magnetic particles within the coating so that the particles are correctly aligned. The disk is then placed in a curing oven to cross-link the polymers in the organic binder and thus harden the disk coating. Following curing, the disk coating is buffed and then washed to remove any debris. A liquid lubricant, such as a perfluoroalkyl polyether, is then applied to the disk and absorbed into the coating to provide lubrication between the head and disk when the flying head comes to rest on the disk surface when disk rotation stops. If it is desired to burnish the disk, then this is done after washing and before the application of the lubricant.

The improvement to the above-described particulate recording disk and to the process for its fabrication is a carbon film formed on the magnetic coating of the cured disk. In one example of the process for forming the carbon layer as an overcoat on the particulate disk, the carbon film was sputter-deposited onto a conventional particulate disk which had as a magnetic coating $\gamma$-$Fe_2O_3$ particles dispersed in an epoxy/phenolic resin binder including alumina particles. The disk was fully cured and burnished, but no lubricant was applied. The thickness of the magnetic coating was approximately 25 micro-inches. The carbon film was applied to this disk by conventional DC planar magnetron sputtering, a process well known in the art and described in *Thin Film Processes*, Academic Press, Vossen, John L., and Kern, Werner, Eds., 1978, pp. 131-173. The target cathode was hard-pressed high-purity graphite. The current was maintained at 1.6 amps at a voltage of 850 volts and the pressure of the Argon gas in the sputtering chamber was 4 millitorrs. No external heating was applied to the disk. With these parameters a 250 Angstrom layer of carbon was deposited in 5 minutes.

A relatively large number of carbon films were sputter-deposited on disks with various organic coatings at currents of between 1.6 to 2 amps, voltages of between 650 to 800 volts and Argon pressures in the range of 4 to 10 microns. The following tables illustrate the durability and frictional properties of representative examples of disks having carbon films sputter-deposited according to the above-described process.

TABLE 1

Durability Testing of Carbon Films

| | Example | | | | | |
|---|---|---|---|---|---|---|
| | 1 | 2 | 3 | 4 | 5 | 6 |
| Binder | epoxy/phenolic | epoxy/phenolic | epoxy/phenolic | epoxy/phenolic | epoxy/phenolic | polyurethane |
| Magnetic Particles Type | $\gamma$-$Fe_2O_3$ | $\gamma$-$Fe_2O_3$ | Silicated Co-doped $\gamma$-$Fe_2O_3$ | Co-doped $\gamma$-$Fe_2O_3$ | Co-doped $\gamma$-$Fe_2O_3$ | Co-doped $\gamma$-$Fe_2O_3$ |
| $Al_2O_3$ (Percent by Vol.)/ (Avg. diam.) | 2%/1$\mu$ | 2%/1$\mu$ | 1%/0.5$\mu$ | None | 1%/0.5$\mu$ | 1%/0.5$\mu$ |
| Carbon Film Thickness | 100Å | 500Å | 100Å | 200Å | 200Å | 100Å |
| Start/Stop Cycles to Failure (Lubricated) | Not Available | Not Available | 1,000–20,000 | 0 | 1,000–20,000 | <2,000 |
| (With Carbon Film) | >20,000 | >20,000 | >20,000 | >20,000 | >20,000 | >20,000 |

TABLE 2

Measured Friction Coefficients

| | Lubricated | | Carbon Film (200Å Thick) | |
|---|---|---|---|---|
| Disk Type | Static | Dynamic | Static | Dynamic |
| Epoxy/phenolic with $Al_2O_3$ (1%/0.5$\mu$) | 0.16 | 0.26–0.53 | 0.15 | 0.15–0.30 |
| | 0.29 | 0.29–0.51 | 0.17 | 0.17–0.39 |
| Epoxy/phenolic with $Al_2O_3$ (2%/1$\mu$) | 0.20 | 0.20–0.57 | 0.17 | 0.17–0.40 |
| Epoxy/phenolic without $Al_2O_3$ | 0.35 | 0.35–0.87 | 0.17 | 0.17–0.39 |

The start/stop test conducted on the examples of Table 1 is a durability test in which one cycle comprises starting rotation of the disk with the slider resting on the disk surface until the slider reaches its flying height and then stopping rotation of the disk and allowing the slider to come to rest on the disk surface. In all disks tested, the testing was stopped after 20,000 cycles since there was no failure of any of the carbon films.

Table 2 illustrates the significant improvement in measured static and dynamic coefficients of friction of disks with various types of coatings and a 200 Angstroms thick carbon overcoat versus disks with a conventional lubricant. All disks with a carbon overcoat also showed a significant improvement over disks with a conventional lubricant in terms of measured stiction force, i.e. the amount of force required to cause the slider to break free from the disk surface at start-up.

The disks with the carbon overcoat sputter-deposited according to the process of this invention showed no significant degradation of any magnetic properties. Numerous disks were tested for missing bits before and after application of the carbon overcoat. The results of such testing indicated no significant change in measured missing bits in the magnetic coating. In addition, the measured average signal amplitude from the disks before and after application of the carbon overcoat showed a reduction of only approximately 1 to 3 percent for carbon overcoat thicknesses in the range of 100 to 250 Angstroms.

Carbon overcoats have also been formed on disk coatings which included no load-bearing particles. The carbon films deposited exhibited sufficient durability so as to make the load-bearing particles unnecessary, as shown by Example 4 in Table 1.

Electron microphotographs of the carbon films deposited in these examples showed essentially an amorphous structure with no long range crystalline ordering. The carbon films also demonstrated excellent adhesion to the magnetic coating with no delamination during buffing tests. In all examples no out-gassing from the organic coatings was observed during the sputtering process, as might have been expected when the coatings were subjected to high vacuum in the sputtering chamber. In addition, since the carbon overcoat is conformal to the underlying organic coating and is deposited as a film of uniform thickness, the disks showed excellent smoothness.

While the preferred embodiments of the present invention have been illustrated in detail, it should be apparent that modifications and adaptations to those embodiments will occur to those skilled in the art without departing from the scope of the present invention as set forth in the following claims.

What is claimed is:

1. In a magnetic recording disk of the type in which a coating of magnetic particles dispersed in an organic binder is formed directly on a substrate, an improvement comprising a carbon layer formed on and adhered to the coating, the carbon layer having an essentially amorphous structure.

2. The improved magnetic recording disk according to claim 1, wherein the disk coating includes load-bearing particles dispersed therein.

3. The improved magnetic recording disk according to claim 1 wherein the carbon layer further comprises a sputter-deposited carbon film.

4. A magnetic recording disk comprising a substrate, a coating on the substrate of magnetic particles dispersed in an organic binder, and a protective carbon film sputter-deposited directly onto the coating, the carbon film having an essentially amorphous structure.

5. The magnetic recording disk according to claim 4 wherein the coating includes load-bearing particles.

6. In a process for the fabrication of a magnetic recording disk, the process being of the type which includes preparing a dispersion of magnetic particles in an organic binder, applying the binder over a suitable substrate to form a magnetic coating and curing the coating, an improvement to the process comprising forming an adherent layer of carbon having an essentially amorphous structure directly onto the cured coating, whereby the durability and lubricity of the disk are enhanced.

7. The improved process according to claim 6 wherein the step of forming a layer of carbon further comprises the step of sputter-depositing a film of carbon.

8. A process for fabricating a magnetic recording disk comprising:
    providing a substrate;
    providing an organic binder containing polymers;
    mixing magnetic particles into the binder;
    applying the binder having magnetic particles dispersed therein onto the substrate as a coating;
    curing the coating to cross-link the polymers and harden the coating; and
    applying by sputter-deposition a thin protective film of carbon having an essentially amorphous structure directly onto the cured coating, whereby the durability and lubricity of the magnetic recording disk are enhanced.

9. The process according to claim 8 including the steps of, prior to applying the thin film of carbon, buffing, washing, and burnishing the cured coating on the substrate.

* * * * *

UNITED STATES PATENT AND TRADEMARK OFFICE
CERTIFICATE OF CORRECTION

PATENT NO. : 4,737,419

DATED : April 12, 1988

INVENTOR(S) : M. M. Hilden, J. J. Lee and A. W. Wu

It is certified that error appears in the above-identified patent and that said Letters Patent is hereby corrected as shown below:

Column 5, line 8, delete the word "directly".

Column 5, line 9, insert after the words "carbon layer formed", the word --directly--.

Signed and Sealed this

Eighth Day of November, 1988

Attest:

DONALD J. QUIGG

Attesting Officer

Commissioner of Patents and Trademarks